(12) United States Patent
Smith

(10) Patent No.: US 10,561,076 B1
(45) Date of Patent: Feb. 18, 2020

(54) GRAPPLE MOUNTED ROPE CONTROLLER AND ROPE ANCHOR RIGGING DEVICE

(71) Applicant: Wayne J. Smith, Brookhaven, MS (US)

(72) Inventor: Wayne J. Smith, Brookhaven, MS (US)

( * ) Notice: Subject to any disclaimer, the term of this patent is extended or adjusted under 35 U.S.C. 154(b) by 0 days.

(21) Appl. No.: 15/278,199

(22) Filed: Sep. 28, 2016

(51) Int. Cl.
*A01G 23/099* (2006.01)
*A01G 3/08* (2006.01)
*B66D 5/00* (2006.01)

(52) U.S. Cl.
CPC .............. *A01G 23/099* (2013.01); *A01G 3/08* (2013.01); *B66D 5/00* (2013.01)

(58) Field of Classification Search
CPC ...... A01G 3/08; A01G 23/099; A01G 23/006; A01G 23/06; A01G 23/062; B66D 5/00; B66D 1/04; B66D 1/36; B66D 1/7452; B66D 3/00; B66D 2700/02
See application file for complete search history.

(56) References Cited

U.S. PATENT DOCUMENTS

| | | | |
|---|---|---|---|
| 13,429 A * | 8/1855 | Gesner | B66C 5/025 254/334 |
| 1,712,697 A | 10/1927 | Gilbert | |
| 2,424,760 A | 7/1945 | Konkle | |
| 3,537,604 A * | 11/1970 | Whisler | A01G 23/006 414/619 |
| 3,860,282 A * | 1/1975 | Johnson | B66C 3/12 294/112 |
| 4,314,693 A * | 2/1982 | Hobbs | B66D 1/30 254/376 |
| 4,400,132 A * | 8/1983 | Deline | A01G 23/006 254/327 |
| 5,484,253 A * | 1/1996 | Johnson | A01G 23/00 144/24.13 |
| 5,909,870 A * | 6/1999 | Funk | B66D 1/36 254/325 |
| 5,971,363 A | 10/1999 | Good | |
| 6,578,823 B1 * | 6/2003 | Johnson | B66D 1/36 242/602.2 |
| 6,631,885 B2 | 10/2003 | Halas | |
| 6,712,338 B2 * | 3/2004 | Schafer | B66D 1/7426 254/335 |
| 7,556,068 B1 * | 7/2009 | Johnson | A01G 23/083 144/34.1 |
| 8,292,041 B1 | 10/2012 | Shull | |

* cited by examiner

Primary Examiner — Sang K Kim
Assistant Examiner — Nathaniel L Adams
(74) Attorney, Agent, or Firm — Laurence P. Colton; Smith Tempel Blaha LLC

(57) ABSTRACT

A grapple mounted rope controller and rope anchor rigging device includes a cylindrical barrel friction surface mounted to a jaw of a grapple to control a rope used in an arborist's rigging procedure. A rope attached to a load is wrapped around the rope controller to control the raising and lowering of loads. The device also includes a cylindrical barrel friction surface mounted to a fork of a grapple that has a cleat permanently affixed to hold fast a load-bearing rope for a time. The rigging tool utilizes the mobility and mass of a skid steer to provide a flexible location for rigging and a fixed mass with which to support rigging of heavy objects such as tree limbs, trunks and other weights.

18 Claims, 3 Drawing Sheets

GRAPPLE MOUNTED ROPE CONTROLLER AND ROPE ANCHOR RIGGING DEVICE

CROSS-REFERENCE TO RELATED APPLICATIONS

None.

FEDERALLY SPONSORED RESEARCH

Not Applicable

SEQUENCE LISTING OR PROGRAM

Not applicable

FIELD OF THE INVENTION

The invention relates to tree maintenance and removal of tree limbs, branches, and other loads.

The present disclosure relates to devices for handling loads in arbor rigging procedures. More particularly, the present disclosure relates to a rope controller and a rope anchor mounted on a grapple of a skid steer. The rope controller and rope anchor are suitable for applying friction to a load bearing rope in the implementation of arbor rigging or other lifting procedures.

Arborist's rigging procedures required the controlled lowering and raising of heavy objects and, in particular, the controlled lowering and to the ground severed portion of a tree. The invention relates to rope controllers and rope anchors mounted to a grapple on a skid steer in which coils of rope are formed on a cylindrical barrel suitable for applying friction, and around a rope anchor for applying additional friction and for tying off a rope securely.

The main purpose of the present invention is to provide a rigging system for lowering and raising severed tree limbs and main trunks utilizing a grapple mounted rope controller and a rope anchor rigging device.

BACKGROUND

This device relates to a rope controller and a rope anchor mounted on a grapple of a skid steer. A standard task during tree-trimming cleanup efforts is the rigging of heavy load such as limbs or tree trunks. A rope is utilized to attach to a load, and then to lower and position the load safely to a secure location. The device is especially useful if load needs to be rapidly raised, for example, to take up slack on a rope when a tree is topped. In many case, no tools or devices other than rope are used to produce a mechanical advantage that assists in controlling a load. There is often no device for controlling a rope used during arborist's rigging procedures. There is often no place to secure a rope used during arborist tree rigging procedures. A rope under tensile load can snap and cause serious injury to tree surgeons if not used in a controlled manner. As tree limbs, tree trunks, and other possible loads can be heavy and dangerous, there is a need for a system that controls a loaded rope, provides a tie-off point for a loaded rope, and provides for the safety of the worker tending the rope. There is a need for devices to wrap rope in order to provide friction to control a line used to raise or lower a load during a rigging procedure.

An arborist is one involved in the care of trees. This often involves trimming and pruning branches that are high off the ground. The work also involves removal of branches and trees that are dead or damaged. Often trees are in landscaped plots, where the dropping of branches or trunks would damage a well-manicured lawn. To avoid ill consequences, an arborist uses ropes to control, lower, and raise removed tree parts.

Arborist frequently encounter the need to sever tree limbs from trees under circumstances in which the limbs are diseased or damaged. A rope may be used to lower the limb to the ground. Providing the proper amount of force to the rope is key in the procedure and necessary to ensure the safety of the workers. In the past rope lines have been held by strong workers, wrapped around trees, or in improvements, winches have been utilized. There is a need to provide a mechanism to wrap a rope and provide friction in controlling a line.

Tree removal and limb maintenance often requires only simple rigging equipment to solve complicated lifts in rigging procedures. In the past, use of a rope, controlled only by a lineman, proved insufficient and dangerous. Tree mounted winches provided an improvement in rigging procedures, however, a tree is fixed in its special position, and this lack of movability of the rope also proved to be detrimental.

The present invention has been developed to provide an improved arborist's rigging system by mounting a rope controller and a rope anchor to the jaw and fork of a grapple, respectively, thereby proving a fixed, yet moveable, heavy foundation for controlling live loads. A friction controller and friction brake act to control live loads and secure loads, as necessary. The cylindrical rope controller barrel provides smooth and evenly applied friction to a rope handling a heavy load. The cylindrical barrel provides a large surface area for taking wraps of rope thus making the rope controller suitable for applying friction to a rope and thereby providing control during the rigging procedure. A cylindrical barrel has high mechanical advantage of increased force due to friction caused by rope coming in contact with a resistant surface and provides friction to accommodate load changes encountered in arborists tree rigging procedures.

It is the object of this invention to provide a rope controller and rope anchor which may be permanently affixed to various skid steer grapples to control the raising and lowering of tree limbs by arborists. The rope controller and rope anchor mounted on a grapple of a skid steer is utilized for lowering, and raising, of heavy loads in a controlled, safe fashion.

Working ropes can be wrapped around the rope controller to provide friction. Additional wraps provide more friction.

What is novel in this system is the use of a rope controller mounted to the jaw of a grapple and a rope anchor mounted to the fork of a grapple which work in combination to control live loads and hold loads securely. What is new and unobvious in this present invention is the mounting of a rope controller mounted to a jaw of a grapple and a rope anchor mounted to a fork of a grapple used with a skid steer.

DESCRIPTION OF THE PRIOR ART

The use of rope controllers has a long history. U.S. Pat. No. 1,710,697, Rope Controller, 1927, to Gilbert, taught a rope controller for use to control the raising and lowering of an anchor. This device had an automatic means to engage the anchor rope to hold the anchor in any desired position. The tool was useful for boats and anchors but would not be applicable to arborist's environments.

There have also been Cable Gripping Mechanism, U.S. Pat. No. 2,424,760, 1945, to Konkle, which provided an improved friction device for gripping a cable that was often wound around a spool. The device sought to provide an improved cable anchor. The piece was complicated in that it required a ring that was helically grooved.

Specific to the arborist's business, the Tree Winch Mounting System, U.S. Pat. No. 5,971,363, to Good, provides a winch drum as well as a rope brake to provide for lifting, lowering and controlling of tree limbs during tree removal. However, the device is fixed to the base of a tree, providing a single fixed point where rigging operations must be enacted. The rope man must be near the device and this also put the rope man in harm's way being beneath the tree and the live load attached to the rope. Additionally, the Good device utilizes the hand powered winch to move a load minimally only over a limited range of distance compared to the greater distance able to be utilized when the motive force is a skid steer.

Friction brakes are commonly used as evidenced by U.S. Pat. No. 8,292,041, 2012, to Shull. The friction brake is suitable for applying friction to one or more load-bearing ropes used in the rigging procedure. Friction brakes are not uncommon in rock climbing and repelling activities. The Shull mechanism is also limited in that it is carried by a tree engaging frame, and therefore, fixed in space during the rigging procedure.

The Arborist Limb Lowering Device and Method, U.S. Pat. No. 6,631,885, 2003, to Halas is also limited by being affixed to the base of a tree.

The problem with prior art in the field of arborist rigging devices, is there is not a moveable foundation that provides a platform for a rope controller and a rope brake. A solution is needed to improved rigging operations, provide a moveable rope controller and rope anchor, provide the capability to rapidly raise a load, and ensure the safety of the worker tending the rope.

Accordingly, it would be advantageous to provide a rope controller and rope anchor used with a grapple that is inexpensive, easy to operate, compact, and simple in design.

SUMMARY OF THE INVENTION

The invention is a grapple mounted rope controller and rope anchor used in arborist's rigging procedures and is designed to provide several advantages.

First, having a rope controller mounted to the jaw of a grapple and a rope anchor mounted to the fork of a grapple is easily movable by moving the attached skid steer making available various positions and angles of rope deployment for arborist rigging procedures.

Another advantage is the skid steer grapple is a firm, solid, heavy foundation that can handle the forces of heavy live loads created by lowering and raising of tree branches, tree trunks, and other loads.

Another advantage is the rope controller and rope anchor can be permanently affixed to various different manufacturer's grapples by means of welding or other means of affixing metal parts to metal pieces.

Yet another advantage is the simplicity of the design of the rope controller and rope anchor system mounted on a grapple. The devices, when attached are readily available to use. When not required for use, the rope controller and rope anchor are not in the way of other rigging operations.

Still another advantage is increased safety for the worker tending the rope. The rope man can control a live load utilizing the principle of friction by controlling the number of rope wraps allowed on the rope controller. The rope tender can hold a load secure using a rope anchor and an associated cleat. The rope man can stand clear of live loads and perform his task safely.

Still further another advantage is the ability is to raise a load rapidly. There are many occasions when a load is being lowered in which the need to rapidly raise the load occurs. A tree being toped may require slack to be taken in rapidly. A tree in a precarious location may require being raised before being removed completely. The motive force of a grapple attached to a skid steer provides ready power to accomplish this rigging procedure.

In all of the situations described, the grapple mounted rope controller and rope anchor does not interfere with normal grapple operations of lifting and moving objects. The device is permanently affixed in an orientation that is useable for the rigger and not a disturbance to other grapple operations.

In view of the foregoing disadvantages inherent in the known types of skid steer adapters in the prior art, the Grapple Mounted Rope Controller and Rope Anchor rigging Device provides a solution to the problem of safely removing tree limb, trunks and other loads during rigging procedures.

There has thus been outlined, broadly, several features of a rope controller and rope anchor used with a grapple in order that the detailed description thereof that follows may be better understood, and in order that the present improvement of the art may be better appreciated. There are additional features that will be described hereinafter and which form the subject matter of the claims appended.

As such, those skilled in the art will appreciate that the conception, upon which this disclosure is based, may readily be utilized as a basis for the designing of other structures, methods, and systems for carrying out the several objects of the present invention. It is important that the claims be regarded as including such equivalent constructions insofar as they do not depart from the spirit and scope of the grapple mounted rope controller and rope anchor rigging device.

BRIEF DESCRIPTION OF THE DRAWINGS

These and other features, aspects, and advantages of a rope controller and a rope anchor used with a grapple will become better understood with regard to the following description, appended claims, and accompanying drawings. Such description makes reference to the annexed drawings wherein:

Figure 1:
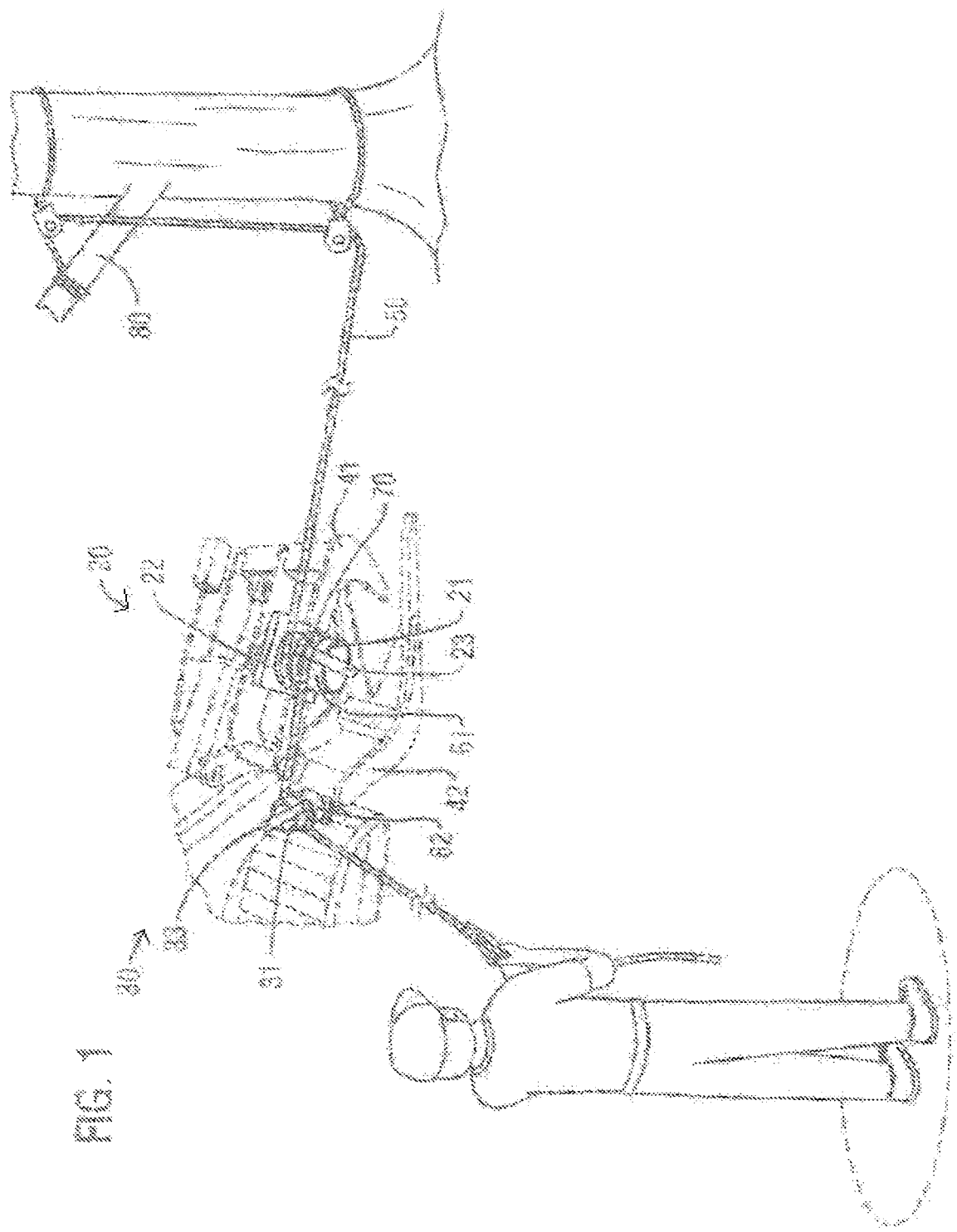
FIG. 1 is a perspective view of the grapple mounted rope controller and rope controller rigging device.
Figure 2:
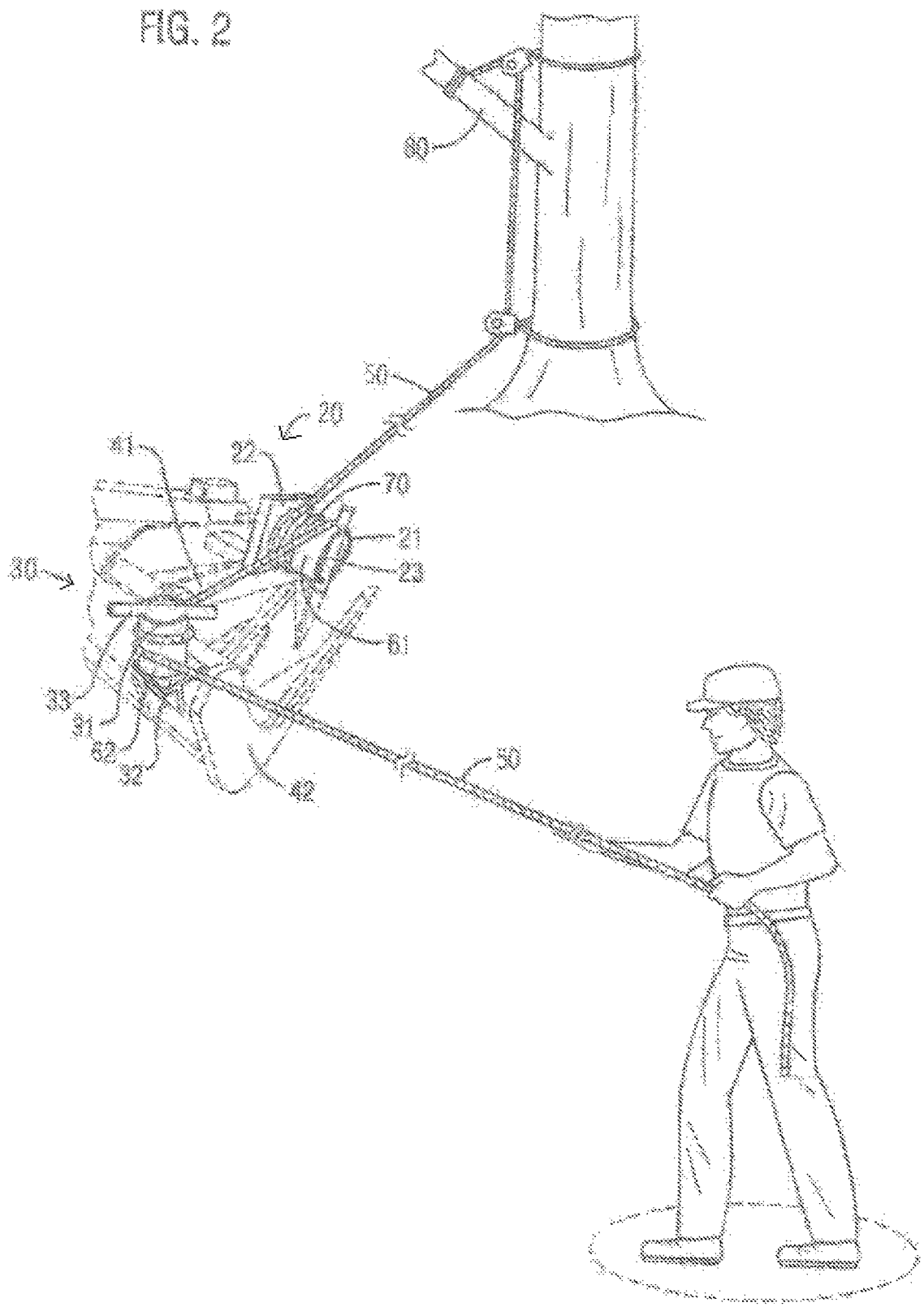
FIG. 2 is a view from aft of the grapple mounted rope controller and rope controller rigging device.
Figure 3:
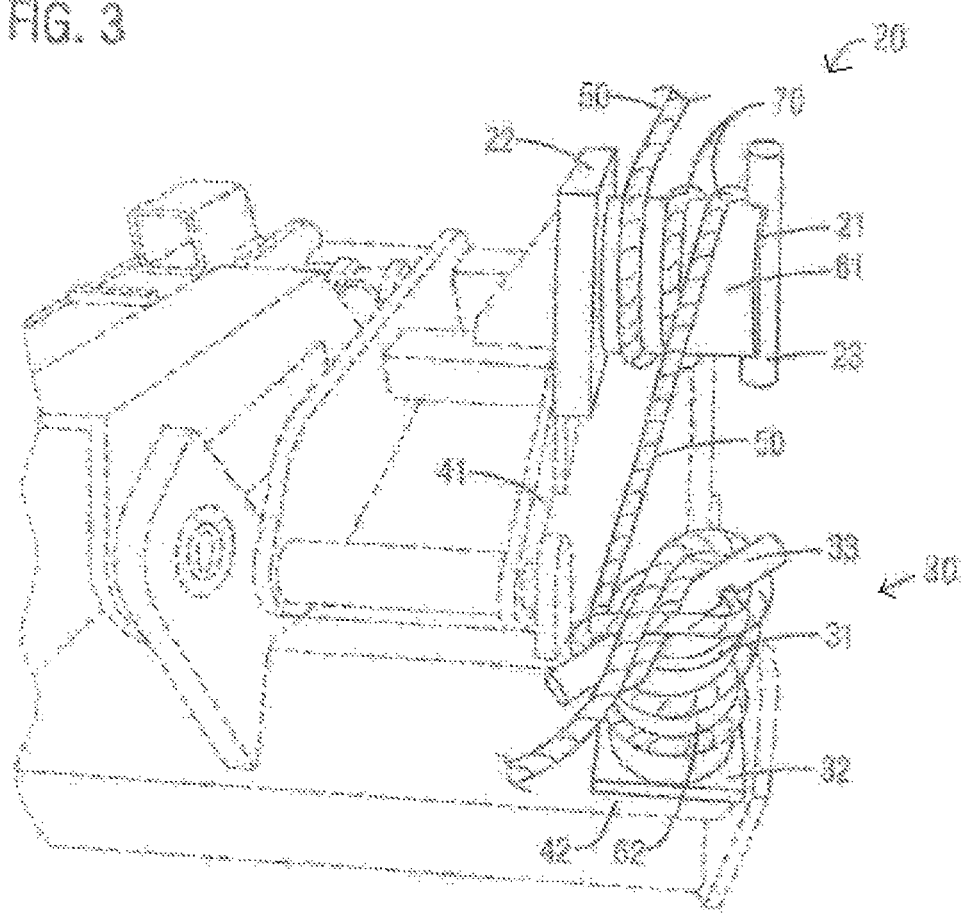
FIG. 3 illustrates the wraps on the rope controller cylindrical barrel and also illustrates the rope tied off utilizing the rope anchor cleat.

| DRAWNGS — Reference Numerals | | | |
|---|---|---|---|
| 10 | Grapple Mounted Rope controller and Rope Anchor Rigging Device | 20 | Rope controller |
| 21 | Rope controller cylindrical barrel | 22 | rope controller mounting plate base |
| 23 | Rope controller pin | 30 | Rope anchor |
| 31 | Rope anchor cylindrical barrel | 33 | Rope anchor cleat |
| 32 | Rope anchor mounting plate base | 41 | Grapple jaw |
| 42 | Grapple fork | 50 | Rope |
| 51 | Wraps or Turns | 52 | Friction surface |

-continued

| DRAWNGS — Reference Numerals | | | |
|---|---|---|---|
| 61 | Rope controller friction surface | 62 | Rope anchor friction surface |
| 70 | Wraps | 80 | Load |

DESCRIPTION OF THE PREFERRED EMBODIMENTS

As best illustrated in FIG. 1, a rope controller 20 is utilized to control the raising and lowering of a load 80 attached to a rope 50. The rope controller 20 includes a steel cylindrical barrel 21 with a wall thickness that withstands the forces induced by heavy a load 80 such as a tree limb, tree trunk, or other rigged loads.

The rope controller 20 has a mounting plate base 22 permanently affixed at one opening, in a transverse plane with respect to a longitudinal axis of the rope controller cylindrical barrel 21. The mounting plate base 22 is permanently affixed to a jaw 41 of a grapple used on a typical skid steer. The rope controller 20 is mounted in an orientation such that the longitudinal axis of the cylindrical barrel 21 is horizontal or nearly parallel with the surface of the ground.

Welding the rope controller cylinder barrel 21 to a mounting plate base 22 and then welding the mounting plate base 22 to a jaw 41 of a grapple is a possible manner of permanently affixing the rope controller 20.

The purpose of the rope controller 20 is to accept wraps of rope around the outer surface of a rope controller cylindrical barrel 21. The outer surface acts as a friction surface 61 to provide force to counteract live a load 80 attached to the rope 50. Control of the load 80 is accomplished by wraps 70 of rope 50 around the rope controller cylindrical barrel 21. Lighter loads will require less wraps to safely control a live load. Heavier loads will require more wraps to control a live load. Utilizing wraps 70 of rope 50 around the rope controller cylindrical barrel 21 controls the load 80 and improves safety by not overstressing the rope 50. The rope controller cylinder barrel 21 is designed to accept at least four wraps of one-inch rope 50. When the proper wraps 70 are utilized on the rope controller 20 then a dangerous slack cable condition, a condition when a rope under tension rapidly releases the weight and then reacquires the weight, is avoided.

The rope controller 20 is mounted forward of a rope anchor 30. Rope 50 is attached to a load 80, fed to a rope controller 20, wrapped around the rope controller cylindrical barrel 21 the proper number of turns corresponding to the weight to be controlled as determined by the skill of the worker in the field, and then fed aft to a rope anchor 30.

At the opposite end of the rope controller cylindrical barrel 21 is a holding pin 23. The holding pin 23 is permanently affixed across the open end of the rope controller cylindrical barrel 21 in a transverse plane. The holding pin 23 may be a piece of steel tubing, a piece of solid tubing, or a flange. The purpose of the holding pin 23 is to prevent rope 50, under a load 80, from slipping off of the friction surface 61 of the rope controller cylindrical barrel 21.

The rope controller cylindrical barrel 21 is allowed to remain open at the holding pin 23 end in order for heat created by the action of friction caused by rope 50 wrapped and moving on the friction surface 61 of the rope controller cylindrical barrel 21, to dissipate away from the rope controller cylindrical barrel 21.

To utilize the rope controller 20, a worker will assess the load 80 to be controlled, wrap the rope 50 around the rope controller cylindrical barrel 21 and then feed the rope 50 aft to, and partly around a rope anchor 30. The worker will then tend the free end of the rope 50 during the rigging procedure.

A grapple jaw 41, being moveable in an up and down manner using skid steer controls, allows alignment of a rope 50 protruding out of the rope controller cylindrical barrel 21 towards a load at various angles with respect to horizontal by raising and lowering the grapple jaw 41.

A rope anchor 30 is utilized to hold fast a load 80 on a rope 50 in an arborist rigging procedure. The rope anchor 30 includes a cylindrical steel barrel 31, that may be fabricated with a diameter smaller than the rope controller cylindrical barrel 21, as a primary purpose is to gain additional mechanical advantage over the forces on a rope 50 under a live load 80. The rope anchor 30 also incorporates a cleat 33 to tie off the rope 50 and hold fast a load 80.

The rope anchor 30 has a mounting plate base 32 permanently affixed at one opening, in a transverse plane with respect to a longitudinal axis of the rope anchor cylindrical barrel 31. The mounting plate base 32 is permanently affixed to a fork 42 of a grapple used on a typical skid steer. The rope anchor 30 is mounted in an orientation such that the longitudinal axis of the cylindrical axis is 90 degrees from the rope controller 20 longitudinal axis making the rope anchor 30 nearly vertical with respect to a horizontal ground surface.

Welding the rope anchor cylinder barrel 31 to a mounting plate base 32 and then welding the mounting plate base 32 to a fork 42 of a grapple is a possible manner of permanently affixing the rope anchor 30.

The purpose of a rope anchor 30 is to provide a device to hold fast a live load 80 attached to a rope 50 in arborist rigging procedures. The outer surface of the rope anchor cylindrical barrel 31 provides a rope anchor friction surface 62 and assist a rope tender in applying a mechanical advantage of force to a rope 50 in addition to the force applied utilizing the wraps of rope 50 on the rope controller 20.

To further assist in holding a live load for extended time periods, a cleat 33 is permanently affixed to the open end of the rope anchor cylindrical barrel 31. The loaded rope 50 may be wrapped around the cleat 33, in a manner similar to a boat line wrapped around a cleat at a dock, to hold fast a live loaded rope 50 for extended time periods without fatiguing a rope tender.

The rope anchor cylindrical barrel 31 is mounted aft of a rope controller 20 at an orientation that allows the rope 50 to progress directly aft from the rope controller 20 to the outside surface of the rope anchor cylindrical barrel 31. A rope 50, after being wrapped around a rope controller 20, is fed aft to a rope anchor 30 and partly around the rope anchor cylindrical barrel 31. Having the rope 50 make contact with the rope anchor 30 provides additional mechanical advantage in the form of friction caused by the rope 50 coming in contact with the outer surface of the rope anchor cylindrical barrel 31.

The rope anchor cylindrical barrel 31 is allowed to remain open at the cleat 33 end in order for heat created by the action of friction caused by rope 50 contacting and moving on the rope anchor friction surface 62, to dissipate away from the rope anchor cylindrical barrel 31.

A grapple fork 42, being moveable in an up and down manner by operation of skid steer controls, allows alignment of a rope 50 protruding out of the rope controller 20 and rope anchor 30 rigging device towards a load 80 at various angles with respect to horizontal by raising and lowering the grapple fork 42.

Thus, the rope controller 20 and rope anchor 30 mounted to a grapple may be oriented using two different controls. The grapple jaw 41 can raise and lower the rope controller 20. The grapple fork 42 can raise and lower both the rope anchor 30 and the rope controller 20. This provides the arborist with a variety of positions and angles with which to control and hold a rope 50 attached to a live load 80.

Various industry grapples may be utilized as a foundation for rope controller and rope anchor mounting plate bases. Once a rope controller is permanently affixed or welded to grapple jaw, and a rope anchor is permanently affixed or welded to grapple fork, the grapple acts as a moveable, or fixed foundation, as required by arborist rigging procedures. The grapple weight and mass, in combination with the skid steer weight and mass is a heavy, yet moveable fixed point for rigging operations. Rope is the line used with this system.

Briefly, the procedure consists of lashing a load 80 such as a limb or main trunk with a rope 50. The rope 50 is lowered down the tree, fed through blocks and fed to a rope controller 20. The rope 50 is wrapped several times around a rope controller cylindrical barrel 21 mounted on a jaw 41 of a grapple of a skid steer. The rope 50 is then passed directly aft, around a rope anchor 30 mounted on a fork 42 of a grapple of a skid steer. The rope 50 makes contact with the rope anchor 30 and is further fed out to a worker tending the rope 50, usually standing aside of the grapple. The free end of the rope is then grasp by an operator standing next to, and clear of, a skid steer grapple and also clear of the load 80. As an arborist cut is completed on a limb or main trunk, and the weight of the wood becomes the load 80 on the rope 50, the wraps 70 of rope 50 around the rope controller cylindrical barrel 21 apply friction to the load-bearing rope 50 suitable for a controlled lowering, or raising, in the arbor rigging operation.

The rope tender can tie off the lower end of the rope 50 to the cleat 33 provided on the rope anchor 30 to securely hold the attached load 80 for extended periods of time. Those skilled in the art should appreciate that the invention provides a particularly versatile system for utilizing a rope controller mounted on a jaw of a grapple and a rope anchor mounted on a fork of a grapple to control and secure heavy loads safely.

CONCLUSION, RAMIFICATIONS AND SCOPE

Although the present invention has been described in considerable detail with reference to certain preferred versions thereof, other versions are possible. Therefore, the spirit and scope of the appended claims should not be limited to the description of the preferred version contained therein. The reader's attention is directed to all papers and documents, which are filed concurrently with this specification and are open to public inspection with this specification, and the contents of all such papers and documents, are incorporated herein by reference. All features disclosed in this specification, including any accompanying claims, abstract, and drawings, may be replaced by alternative features serving the same, equivalent or similar purpose, unless expressly stated otherwise.

What I claim is:

1. A rope controller and rope anchor system comprising:
    a rope controller coupled directly to a first mechanical jaw; and
    a rope anchor coupled directly to a second mechanical jaw, the first mechanical jaw being movable relative to the second mechanical jaw,
    wherein the rope controller supports a rope coupled to a load, the rope being fed to the rope controller and therein wrapped around the rope controller, the rope controller being positioned between the attached load and the rope anchor where a first portion of the rope exiting the rope controller is coupled to the attached load and a second portion of the rope exiting the rope controller is coupled to the rope anchor, and the rope anchor maintains the rope substantially immobile when no motion is required of the attached load on the rope, meanwhile, the rope anchor provides a mechanical advantage on a third portion of the rope exiting the rope anchor when motion is required of said load on the rope.

2. The system of claim 1, wherein the rope controller comprises a cylindrical barrel made of metal.

3. The system of claim 2, wherein the metal comprises steel.

4. The system of claim 1, wherein the rope anchor comprises a cylindrical barrel made of a metal.

5. A rope controller and rope anchor system comprising:
    a rope controller fastened directly to a first movable surface; and
    a rope anchor fastened directly to a second movable surface, the first movable surface being movable relative to the second movable surface,
    wherein the first movable surface and the second movable surface are part of skidsteer loader,
    wherein the first movable surface and the second movable surface comprise portions of mechanical jaws, and
    wherein the rope controller supports a rope coupled to a load, the rope being fed to the rope controller and therein wrapped around the rope controller, the rope controller being positioned between the attached load and the rope anchor where a first portion of the rope exiting the rope controller is coupled to the attached load and a second portion of the rope exiting the rope controller is coupled to the rope anchor, and the rope anchor maintains the rope substantially immobile when no motion is required of the attached load on the rope, meanwhile, the rope anchor provides a mechanical advantage on a third portion of the rope exiting the rope anchor when motion is required of said load on the rope.

6. The system of claim 5, wherein the rope controller and rope anchor both comprise cylindrical barrels made of metal.

7. A grapple mounted rope controller and rope anchor rigging device comprising:
    a rope controller mounted directly to a grapple jaw of a skidsteer loader, and
    a rope anchor mounted directly to a grapple fork, the grapple jaw of the skidsteer loader being movable relative to the grapple fork;
    wherein said rope controller acts to control friction forces of an attached load on a rope, said rope fed to said rope controller and therein wrapped around said rope controller,
    wherein said rope anchor acts to provide a friction force to said rope fed from said rope controller to said rope anchor, said rope controller being positioned between an attached load and the rope anchor where a first portion of the rope exiting said rope controller is coupled to the attached load and a second portion of the rope exiting said rope controller is coupled to the rope anchor, and wherein said rope anchor also acts as a holding device to maintain said rope substantially immobile when no motion is required of said attached load on said rope, whereby said rope anchor provides a mechanical advantage on a third portion of the rope exiting the rope anchor when motion is required of said attached load on said rope during a tree surgeon's rigging procedure.

8. The grapple mounted rope controller and rope anchor rigging device of claim 7, wherein said rope controller further comprises a rope controller cylindrical barrel, which is a steel hollow tube of cylindrical shape with a wall thickness that withstands said friction force induced by said attached load on said rope, and wherein said rope controller cylindrical barrel is utilized to resist said friction force of said attached load on said rope wrapped around said rope controller cylindrical barrel.

9. The grapple mounted rope controller and rope anchor rigging device of claim 7, wherein said rope controller has a mounting plate base permanently affixed at one end of a rope controller cylindrical barrel, in a transverse plane with respect to a longitudinal axis of said rope controller cylindrical barrel, and wherein said mounting plate base is firmly affixed to said grapple jaw, wherein said rope controller is mounted in an orientation such that said longitudinal axis of said rope controller cylindrical barrel is horizontal.

10. The grapple mounted rope controller and rope anchor rigging device of claim 7, wherein a rope controller cylindrical barrel accepts wraps of said rope around an outer surface of said rope controller cylindrical barrel and utilizes said friction force to counteract said attached load on said rope.

11. The grapple mounted rope controller and rope anchor rigging device of claim 7, wherein said rope controller utilizes a holding pin mounted at an end of a rope controller cylindrical barrel opposite a mounting plate base wherein said holding pin is of strength to prevent said wraps of said rope from slipping off of said rope controller cylindrical barrel.

12. The grapple mounted rope controller and rope anchor rigging device of claim 7, wherein said rope controller is permanently mounted to said grapple jaw in a position forward of said rope anchor mounted on said grapple fork.

13. The grapple mounted rope controller and rope anchor rigging device of claim 7, wherein said rope anchor further comprises a rope anchor cylindrical barrel, which is a steel hollow tube of cylindrical shape with a wall thickness that withstands said friction force induced by said attached load on said rope, and wherein said rope anchor cylindrical barrel is utilized to hold fast said friction force of said attached load on said rope wrapped around said rope anchor cylindrical barrel.

14. The grapple mounted rope controller and rope anchor rigging device of claim 7, wherein said rope anchor has a mounting plate base permanently fixed at one end of a rope anchor cylindrical barrel in a transverse plane with respect to a longitudinal axis of said rope anchor cylindrical barrel, and wherein said mounting plate base is firmly affixed to said grapple fork, wherein said rope anchor is mounted in an orientation such that said longitudinal axis of said rope anchor cylindrical barrel is about 90 degrees from said longitudinal axis of said rope controller, making said rope anchor cylindrical barrel about vertical relative to a horizontal ground.

15. The grapple mounted rope controller and rope anchor rigging device of claim 7, wherein said rope anchor has a cleat permanently affixed in a transverse plane at an end of a rope anchor cylindrical barrel opposite a mounting plate base and wherein said cleat is of strength to hold fast said attached load on said rope.

16. The grapple mounted rope controller and rope anchor rigging device of claim 7, wherein said rope anchor provides an outer surface of a rope anchor cylindrical barrel to provide a point of contact for said friction force to counteract said attached load on said rope, and further wherein a cleat provides a surface where said rope is wrapped to hold fast said attached load on said rope for a period of time without tending by said tree surgeon.

17. The grapple mounted rope controller and rope anchor rigging device of claim 7, wherein said rope anchor is permanently mounted to said grapple fork in a position aft of said rope controller mounted on said grapple jaw and wherein said rope anchor is permanently mounted to allow said rope to feed directly aft from said rope controller to said rope anchor.

18. The grapple mounted rope controller and rope anchor rigging device of claim 7, wherein said rope is fed from said attached load to said rope controller and then said rope is wrapped around a rope controller cylindrical barrel and then said rope is fed directly aft to said rope anchor and allowed to come in contact with said outer surface of said rope anchor cylindrical barrel and then is tended by said tree surgeon, or held fast on a cleat by wrapping said rope around said cleat.

\* \* \* \* \*